(12) United States Patent
Ramnauth et al.

(10) Patent No.: US 7,354,227 B2
(45) Date of Patent: Apr. 8, 2008

(54) APPARATUS AND METHOD FOR MANUFACTURING PLASTIC FRAMEWORKS SUCH AS WINDOW FRAMES

(75) Inventors: Vinode Ramnauth, Ontario (CA); Leon Gimelshtein, Thornhill (CA)

(73) Assignee: Pro-Line Automation Systems Ltd., Ontario (CA)

( * ) Notice: Subject to any disclaimer, the term of this patent is extended or adjusted under 35 U.S.C. 154(b) by 527 days.

(21) Appl. No.: 10/849,986

(22) Filed: May 20, 2004

(65) Prior Publication Data

US 2005/0257361 A1    Nov. 24, 2005

(51) Int. Cl.
*B23Q 5/022*    (2006.01)

(52) U.S. Cl. .................. 408/69; 408/42; 408/234; 408/236; 29/33 K; 29/564; 409/201

(58) Field of Classification Search ............... 408/69, 408/234, 236, 70, 237, 103; 29/563, 564, 29/33 P, 34 B, 33 K; 83/485–489; 409/201, 409/211, 216
See application file for complete search history.

(56) References Cited

U.S. PATENT DOCUMENTS

| | | | | |
|---|---|---|---|---|
| RE26,393 | E | * | 5/1968 | Daugherty .................. 409/118 |
| 3,559,256 | A | * | 2/1971 | Lemelson .................... 29/33 P |
| 3,572,182 | A |   | 3/1971 | MacDonald |
| 4,043,700 | A | * | 8/1977 | Singer ........................ 408/237 |
| 4,050,838 | A |   | 9/1977 | Kneip |
| 4,637,761 | A | * | 1/1987 | Murray et al. ................ 408/16 |
| 4,658,485 | A | * | 4/1987 | Yang .......................... 29/26 A |
| 4,909,892 | A |   | 3/1990 | Quinn et al. |
| 4,967,947 | A | * | 11/1990 | Sarh ............................. 227/52 |
| 5,022,143 | A |   | 6/1991 | Kautt |
| 5,088,171 | A | * | 2/1992 | Suzuki ......................... 29/26 A |
| 5,253,400 | A | * | 10/1993 | Conachen ....................... 29/55 |
| 5,370,835 | A |   | 12/1994 | Sturtz |
| 5,448,819 | A |   | 9/1995 | Grassi |
| 5,538,372 | A | * | 7/1996 | Cuneo et al. ............... 409/131 |
| 5,660,670 | A |   | 8/1997 | Sturtz |
| 5,704,743 | A |   | 1/1998 | Goursenberg |
| 5,753,065 | A |   | 5/1998 | Buzzelli |
| 5,848,458 | A | * | 12/1998 | Bullen ........................ 29/33 K |
| 5,868,185 | A | * | 2/1999 | Poling et al. ............. 144/286.5 |
| 5,927,911 | A |   | 7/1999 | Steiner |

(Continued)

FOREIGN PATENT DOCUMENTS

EP    0 443 398 B1    2/1991

*Primary Examiner*—Monica Carter
*Assistant Examiner*—Michael W. Talbot
(74) *Attorney, Agent, or Firm*—Gifford Krass Sprinkle Anderson & Citkowski

(57) ABSTRACT

A production line for carrying out machining and cleaning operations on rectangular frameworks, is provided. Elongate plastic frame members are welded together in a welding machine, thereby forming two rectangular frameworks located one above the other. These are moved to a framework processing machine along separate predetermined paths with the first path being located above the second path. The paths are provided by horizontally extending guide arrangements on the machine which has a power tool for carrying out machining operations, this tool being supported by a transporting mechanism capable of moving the tool both horizontally and vertically. Machining steps are carried out on the two frame works while they are held one above the other. The frameworks are moved to a weld cleaning machine along respective upper and lower paths for further processing operations.

21 Claims, 12 Drawing Sheets

U.S. PATENT DOCUMENTS

| | | | |
|---|---|---|---|
| 5,946,790 A * | 9/1999 | Graham et al. ............... 29/564 |
| 6,006,408 A | 12/1999 | Rogat |
| 6,086,703 A | 7/2000 | Sturtz |
| 6,099,212 A | 8/2000 | Marocco |
| 6,254,317 B1 * | 7/2001 | Chang ....................... 408/1 R |
| 6,294,044 B1 | 9/2001 | Schwaiger et al. |
| 6,357,094 B1 * | 3/2002 | Sugimoto .................. 29/27 C |
| 6,662,083 B2 | 12/2003 | Angel |
| 6,920,679 B2 * | 7/2005 | Hessbruggen et al. ........ 29/563 |
| 7,065,856 B1 * | 6/2006 | Lemelson .................... 29/563 |
| 7,096,913 B2 * | 8/2006 | Ramnauth et al. .......... 156/391 |
| 2004/0093707 A1 * | 5/2004 | Ramnauth et al. ............. 29/39 |
| 2005/0084354 A1 * | 4/2005 | Feinauer et al. ............ 408/236 |
| 2005/0241130 A1 * | 11/2005 | Ramnauth et al. .......... 29/56.5 |

* cited by examiner

APPARATUS AND METHOD FOR MANUFACTURING PLASTIC FRAMEWORKS SUCH AS WINDOW FRAMES

BACKGROUND OF THE INVENTION

This invention relates to a method for manufacturing plastic frameworks and a machine for carrying out machining operations that can be used with this method.

The use of four-head welding machines to form window frames and window sashes from elongate plastic sections is well known in the window manufacturing industry. This known machine, which welds the frames in a horizontal position, is capable of welding together two window frames at once in a preferred embodiment. After the frameworks have been welded, it generally is necessary to carry out certain machining and cleaning steps on the rectangular frames to prepare them for use as a window or sash. For example, it is commonly necessary to drill holes or to cut slots in the frames in order to prepare them for window hardware such as hinges and window opening mechanisms. Also, because there is generally excess weld material at the four corners of each frame as a result of the welding process, it is necessary to remove this excess plastic material and it is known to carry out this "corner cleaning process" by means of an automated corner cleaning machine. Further equipment, such as conveyors, can also be provided to move the welded framework from the welding machine to the machine or machines for carrying out machining and/or cleaning steps on the frames.

Despite the relatively high output of the known four-head welding machines that are capable of welding at least two window frames or sashes simultaneously, in the past corner cleaning machines have typically only been capable of cleaning one window frame or sash at a time. Also, the known conveying or feeding devices that have been used typically only transfer one frame at a time to the corner cleaning machine, which may also be capable of carrying out processing steps such as drilling required holes. Accordingly, there is a perceived need to speed up the window frame processing and window frame cleaning steps in the production line or equipment that is downstream from the four head welding machine. Although this could be accomplished by having two separate production lines for the window frames or sashes that receive the welded frameworks from the welding machine, this solution poses its own difficulties such as the requirement for an additional amount of floor space in the plant and the possible difficulty of matching up window frames or a window frame and a window sash that are to be sold together or that are to be connected to each other.

U.S. Pat. No. 6,086,703 issued Jul. 11, 2000 to Willi Sturtz Maschinenbau GmbH teaches a method and apparatus for manufacturing two plastic window frames at substantially the same time using a horizontal four-head welding machine: After at least partial cooling, the two welded window frames are released and removed. Special support elements located adjacent two of the welding heads are used for this purpose. The frames are moved out of the welding machine by means of a movable carriage on which two other welding heads are mounted. They are moved to an intermediate station on two conveyor belts located one above the other and then they are moved to a work station such as a bead cleaning machine.

Recent U.S. Pat. No. 6,006,408 issued Dec. 28, 1999 to Wegoma, Inc. teaches a window frame weld seam cleaner having a fixed support head and a movable support head. An inner conveyor belt moves a single window frame into and out of a first cleaning position for cleaning and machining the top corners of the window frame and into and out of a second cleaning position for cleaning and machining the bottom corners. The conveyor includes fixed and movable fences, table top back fences and clamps.

In applicant's co-pending U.S. patent application Ser. No. 10/716,344 filed Nov. 18, 2003 and entitled "APPARATUS AND METHOD FOR MOVING FRAMEWORKS BETWEEN WORK STATIONS", there is disclosed a production line for manufacturing plastic frameworks such as window frames that includes a four-head automated welding machine capable of welding the four corners of two window frames, an optional processing machine for carrying out manufacturing steps on the welded frames and a corner cleaning machine. The line also uses clamping arm assemblies for moving the two plastic frameworks from the welding machine to the processing machine and then for moving the partially processed frameworks to the corner cleaning machine. The disclosure and drawings of this copending application are incorporated herein by reference. The disclosed method includes pulling partially cooled frameworks from the welding machine after they have been released from this machine along respective first and second pairs of horizontally extending guide rails using two gripper arm assemblies movably mounted on respective horizontally extending tracks. The first pair of guide rails is located above the second pair and the adjustable distance between the guide rails of each pair corresponds to an external dimension of the framework that is to be supported thereby. This pending patent application also describes a weld cleaning machine that is capable of carrying out processing steps as well on two plastic frameworks. Tools and knives are arranged on each side of this machine on a tools mounting plate which extends vertically and which can be moved vertically as required for carrying out the processing steps. In addition to weld cleaning knives mounted on movable knife holders, this machine can also be equipped with cutting tools and drilling unit assemblies.

According to one aspect of the present invention, it is an object of the invention to provide an improved machine for carrying out machining operations on a rectangular framework using at least one power tool, this tool being maneuverable in more than one direction in order to position it to carry out a number of machining operations.

According to another aspect of the invention, it is an object of the present invention to provide an improved apparatus for carrying out machining operations on plastic frameworks that employs a power tool that can be maneuvered in different ways in order to permit the tool to carry out different machining operations on a plastic framework, and that can be manufactured at a reasonable cost and in a way that makes the machine quite efficient and flexible.

According to a further aspect of the invention, it is an object of the invention to provide an improved method for processing plastic frameworks that includes forming two such frameworks in a welding machine and then moving these frameworks to a processing machine where processing steps can be carried out on the two frameworks by at least one power tool, the position of which can be changed to permit the tool or tools to carry out a variety of processing steps.

According to yet another aspect of the invention, it is an object of the invention to provide an improved method for manufacturing plastic frameworks that includes forming two rectangular frameworks in a welding machine, then carrying out machining operations on these frameworks by one or more tools mounted in a processing machine, and then moving these frameworks to a weld cleaning machine where additional processing steps including weld cleaning steps are carried out.

SUMMARY OF THE INVENTION

According to one aspect of the invention, a machine for carrying out machining operations on rectangular frameworks using at least one power tool includes a machine base frame having a length and a width and at least one framework guide supporting device mounted on this base frame. Two horizontally extending guide arrangements are mounted one above the other on the at least one supporting device, these guide arrangements being adapted to guide and support respectively two of the rectangular frameworks for intermittent horizontal movement relative to the machine in the lengthwise direction of the base frame. The machine also includes a tool supporting mechanism and at least one power tool for carrying out machining operations on the frameworks. A transporting mechanism is mounted on the tool supporting mechanism and supports the at least one power tool. This transporting mechanism is capable of moving the at least one power tool both horizontally in the lengthwise direction of the base frame and vertically relative to the base frame. During use of this machine, the at least one power tool can carry out one or more machining operations on the two frameworks and the frameworks are supported one above the other on the two guides arrangements.

Preferably, there are two of the at least one guide supporting device and each of these devices includes an elongate horizontal support frame mounted on the base frame. One of these support frames is mounted for horizontal sliding movement of the base frame in the widthwise direction of the base frame.

According to another aspect of the invention, an apparatus for carrying out machining operations on a workpiece includes a tool carriage mechanism adapted for mounting on a support member and movable with respect to the support member. The tool carriage mechanism includes a base unit mountable on the support member, a support post having one end rotatably mounted on or in the base unit, and a first drive motor unit capable of rotating the support post about a central longitudinal axis of the post. There is also a power tool for carrying out machining operations, this tool including a second drive motor and a tool member rotatable by the second drive motor. A support arm is pivotable about a transverse axis that is substantially perpendicular to the central longitudinal axis. This support arm is mounted on a second end of the support post which is opposite the aforementioned one end and the power tool is mounted on a section of the support arm spaced away from the support post. A third drive motor unit is capable of pivoting the support arm and the attached power tool about the transverse axis. The support arm and the third drive motor unit can be used to change the operating orientation of the power tool during use of the apparatus.

Preferably the tool carriage mechanism includes a vertical main mounting plate on which the base unit is movably mounted and a drive motor mechanism adapted for moving the base unit vertically on the main mounting plate. This drive motor mechanism includes a fourth drive motor mounted on the base unit.

According to a further aspect of the invention, there is provided an apparatus for carrying out machining operations on plastic frameworks such as window frames, this apparatus including a power tool for carrying out machining operations on one of the plastic frameworks. The power tool includes a first drive motor and a tool device operatively connected to and adapted to be driven by the first drive motor. A lever member is pivotable about a first horizontal pivot axis and supports the power tool at a location spaced away from the pivot axis. There is also a vertically extending, first support structure on which the lever member is mounted for pivotable movement about the horizontal pivot axis. In addition, there is a horizontally extending, second support structure on which the first support structure is mounted for rotation about a substantially vertical axis of rotation. The second support structure is movably mounted on a third support structure. A second drive motor is mounted on the first support structure and is operatively connected to the lever member in order to pivot the lever member about the pivot axis. A drive motor system is mounted on one of the first and second support structures and is operatively connected to rotate the first support structure about the axis of rotation in a desired manner. The operating orientation of the tool device can be turned about the two axes during use of the apparatus.

Preferably the third support structure includes a vertically extending main mounting plate on which the second support structure is vertically movable and the apparatus includes a further drive motor system for moving the second support structure vertically on the main mounting plate. The further drive motor system includes a further drive motor mounted on the second support structure.

According to still another aspect of the invention, a method for processing plastic frameworks such as window frames includes welding elongate plastic frame members together in a plastic frame welding machine and thereby forming two rectangular plastic frameworks located one above the other. These frameworks are moved to a framework processing machine with one of the plastic frameworks being moved along a first predetermined path to the processing machine and the other of the frameworks being moved along a second predetermined path to this machine. The second path is located above the first path. Processing steps are then carried out on both of the plastic frameworks by means of the processing machine while the frameworks are both positioned on the processing machine and one of them is held higher than the other. The processing steps are carried out by at least one power tool having a drive motor. The power tool is mounted on a lever member pivotable about a horizontal pivot axis and is located away from the pivot axis. The lever member is mounted on a vertically extending support structure for pivotable movement about the horizontal pivot axis. The processing steps include manipulating the or each power tool to carry out one or more processing steps on at least one of the plastic frameworks by pivoting the lever member and the power tool about the horizontal pivot axis and rotating the support structure about a substantially vertical axis so that the power tool is properly positioned and oriented for the one or more processing steps.

According to yet another aspect of the invention, a method for manufacturing plastic frameworks such as window frames includes welding the elongate plastic frame members together in a plastic frame welding machine and thereby forming two rectangular plastic frameworks located one above the other. The two plastic frameworks are moved to a framework processing machine with one of the frameworks being moved along a first predetermined path to the machine and the other of the frameworks being moved along a second predetermined path to the machine. The second path is located above the first path. Machining operations are carried out on both of the plastic frameworks by means of one or more power tools mounted on the processing machine while the plastic frameworks are both positioned on this machine and one of them is held higher than the other. The plastic frameworks are then moved to a weld cleaning machine with one of the plastic frameworks being moved along a lower path to the weld cleaning machine and the other of the frameworks being moved along an upper path located above the lower path to the machine. Processing operations are then carried out and these include weld cleaning steps on both the machined plastic frameworks while these frameworks are positioned on the weld cleaning machine and one of the frameworks is held higher than the other.

In the preferred method, the first predetermined path is defined by a first guide arrangement mounted on the framework processing machine and extending substantially horizontally and the second predetermined path is defined by a second guide arrangement mounted on the framework processing machine and extending substantially horizontally.

Further features and advantages of the preferred apparatus, machines and methods of the invention will become apparent from the following detailed description taken in conjunction with the accompanying drawings.

DETAILED DESCRIPTION OF PREFERRED EMBODIMENTS

Figure 9:
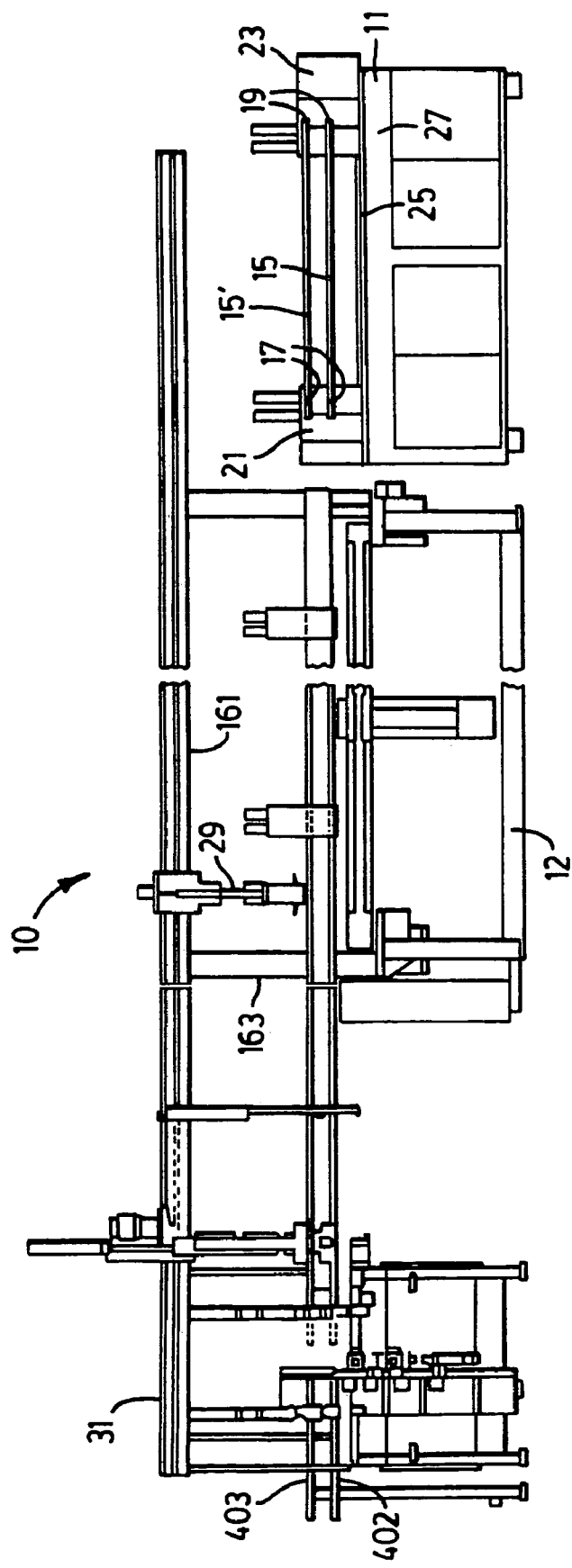
FIG. 9 is a side elevation of a production line for manufacturing frameworks, such as window frames or sashes, this line including a known form of four-point automatic welder located on the right side, the processing machine of FIGS. 1A and 1B located centrally, and a corner cleaning machine located on the left.

Referring initially to FIG. 9 which illustrates a production line that incorporates a machine for carrying out machining operations constructed in accordance with the invention, this machine or apparatus indicated generally at 10 is able to carry out machining operations on rectangular frameworks, such as window frames and window sashes using one or more power tools. The machine 10 is shown by itself and in greater detail in FIGS. 1A, 1B, 2A, 2B and 3 of the drawings. This window frame processing machine is built on a base frame 12 having a length and a width that sits on the floor of the manufacturing plant. This base frame includes a number of upright tubular posts 13. Shown on the right side of FIG. 9 is a known type of four-point automated welding machine 11 capable of welding the four corners of two window frames or sashes, or a combination of a window frame and a sash, described generally herein as frameworks. Two window frames or sashes are indicated at 15 and 15' in FIG. 9 and are shown in chain-link lines in this figure. In the welding machine the window frames are arranged one above the other as shown and are spaced apart a suitable distance for mounting and welding purposes. It will be understood that each of the frames has four corners, for example, two corners located at the left edge 17 and two corners located at the right edge 19. The left side corners are positioned within two left side welding units 21 wherein these corners can be heated and welded together by suitable electrically heated welding plates. Similarly, the right side corners 19 are welded in right side welding units 23. Such four-pointed automated welding machines are well known in the plastic frame manufacturing industry and accordingly a detailed description herein is deemed unnecessary. The welding machine has been illustrated in FIG. 9 in order to show and demonstrate how the machining apparatus of the present invention can be used in conjunction with such a welding machine in order to facilitate the overall manufacturing and cleaning process.

Figure 1A:
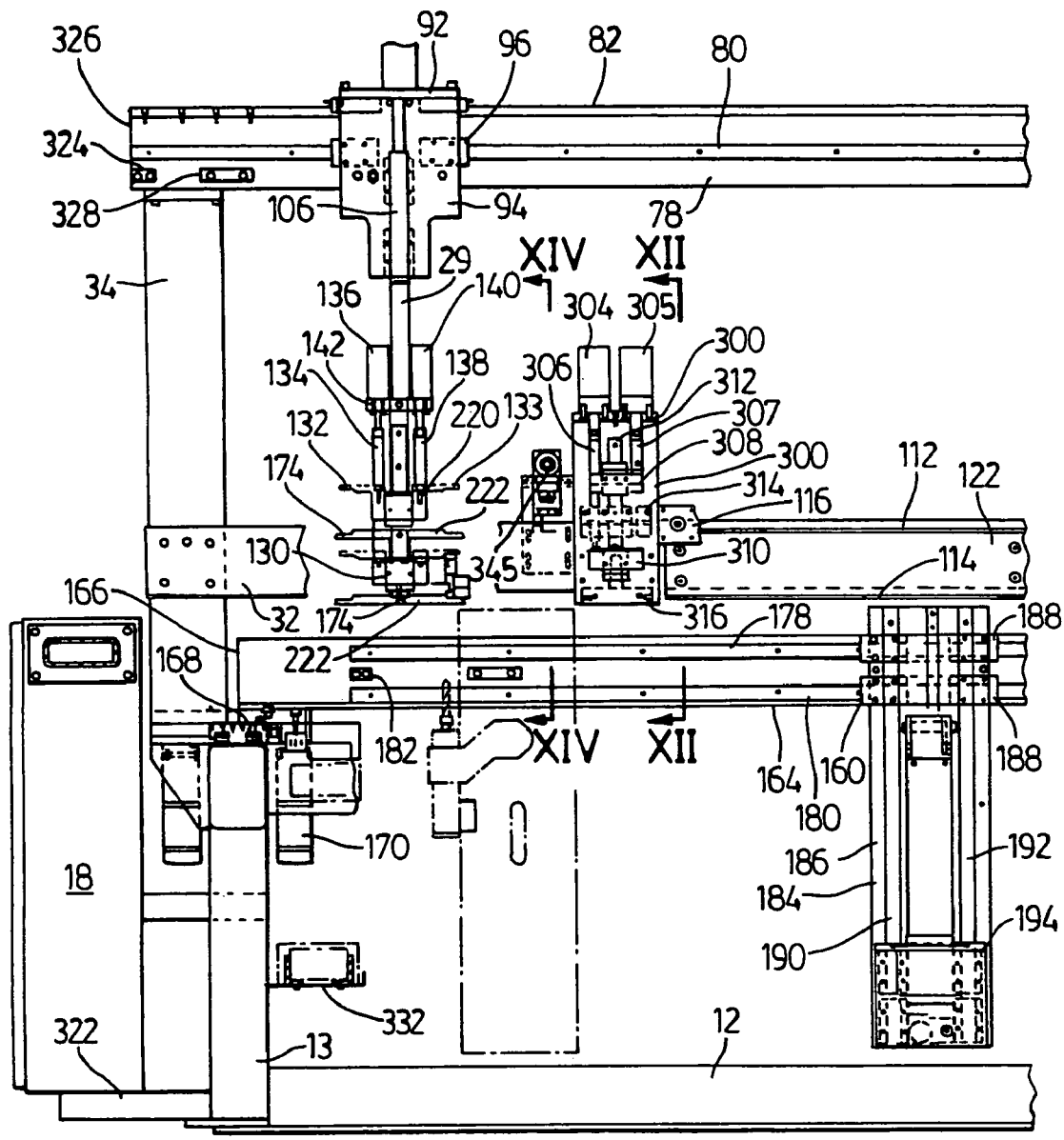
FIGS. 1A and 1B are side elevations of an apparatus for carrying out machining operations on plastic frameworks, FIG. 1A showing a left hand portion of the apparatus and FIG. 1B showing a right hand portion of the apparatus.
Figure 1B:
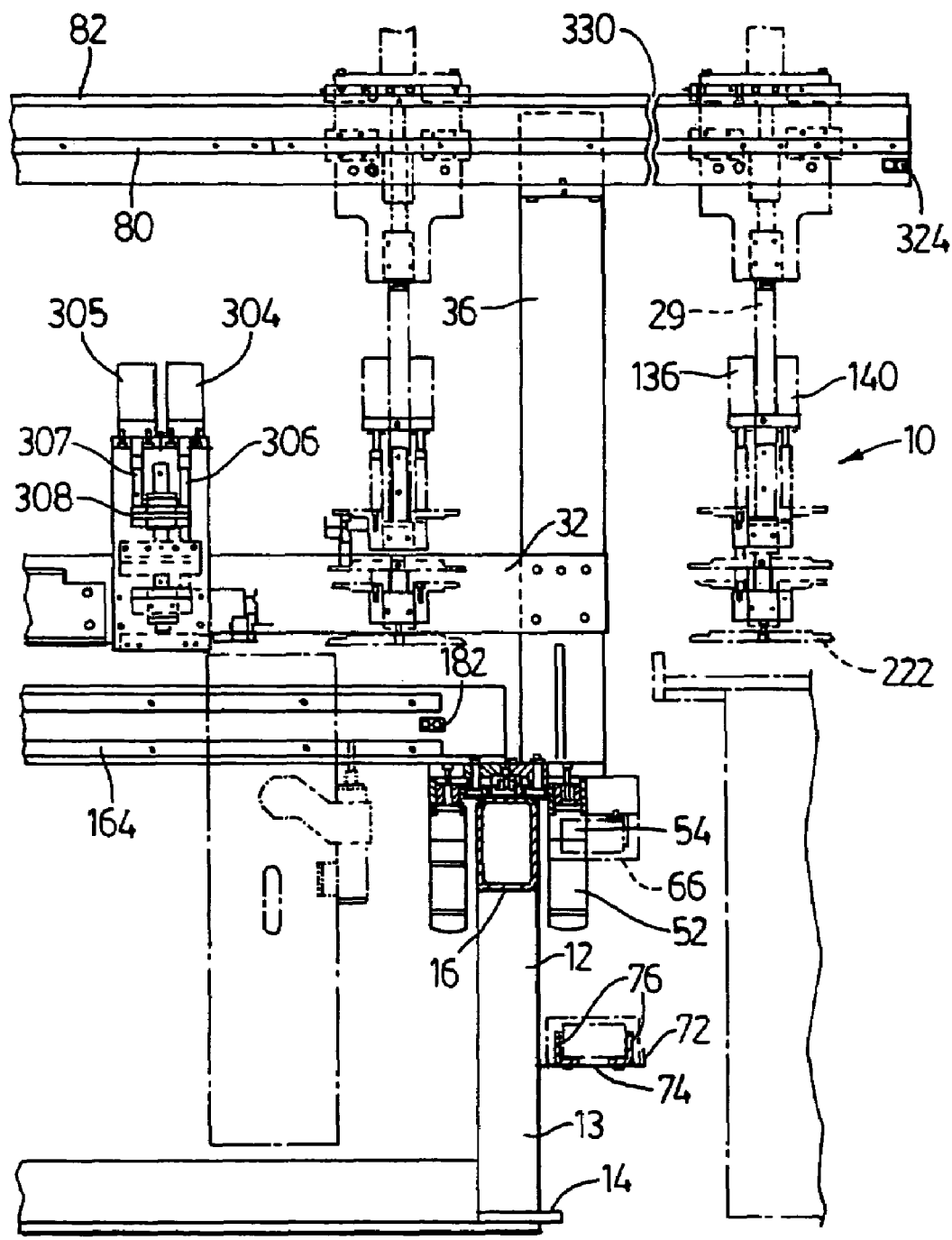

The distances between the various welding units 21, 23 can be adjusted so that the welding machine is capable of welding frameworks of different widths and lengths. In the illustrated welder, the right side welding units 23 are the fixed units while the left side welding units 21 are movable in the horizontal direction along suitable guide rails 25 mounted on the welder frame 27. The guide rails are mounted on a cross-mounting rail (not shown) which allows for the distance between the two corner welders on each of the left and right sides to be changed. Once a welding operation is completed, the welding units are able to hold the window frames in a horizontal position where they can be picked up by robot arm assemblies described hereinafter. One of these robot arm assemblies is indicated generally at 29 in FIGS. 1A, 1B and 9. Preferably, by means of two of these robot arm assemblies, two frameworks can be moved to and through the processing machine of the invention. In the preferred embodiment, these two arm assemblies are able to transfer the two frameworks simultaneously to the processing machine 110 along first and second predetermined paths, the second path being located above the first path. Also shown in FIG. 1 is a corner cleaning machine 31 which is located immediately downstream from the processing machine 10. This processing machine is not part of the processing machine 10 and accordingly will not be described herein in detail. Generally, the machine 31 is capable of cleaning or removing excess weld material from each of the four corners of each framework by means of suitable knives provided for this purpose. The corner cleaning machine is also preferably fitted with power tools such as cutters and drills to carry out additional manufacturing steps on the frameworks that have not already been done by the processing machine 10 of the invention. The corner cleaning machine 31 has a lower guide arrangement 402 defining at least part of a lower path for one framework and an upper guide arrangement 403 defining at least part of an upper path for the other framework. Both of these guide arrangements extend horizontally.

A weld cleaning machine that can be used in conjunction with and adjacent to the processing machine of the invention is described and illustrated in applicant's co-pending U.S. patent application Ser. No. 10/716,344 filed Nov. 18, 2003. The description and drawings of this co-pending United States patent application are incorporated herein by reference.

Figure 13:
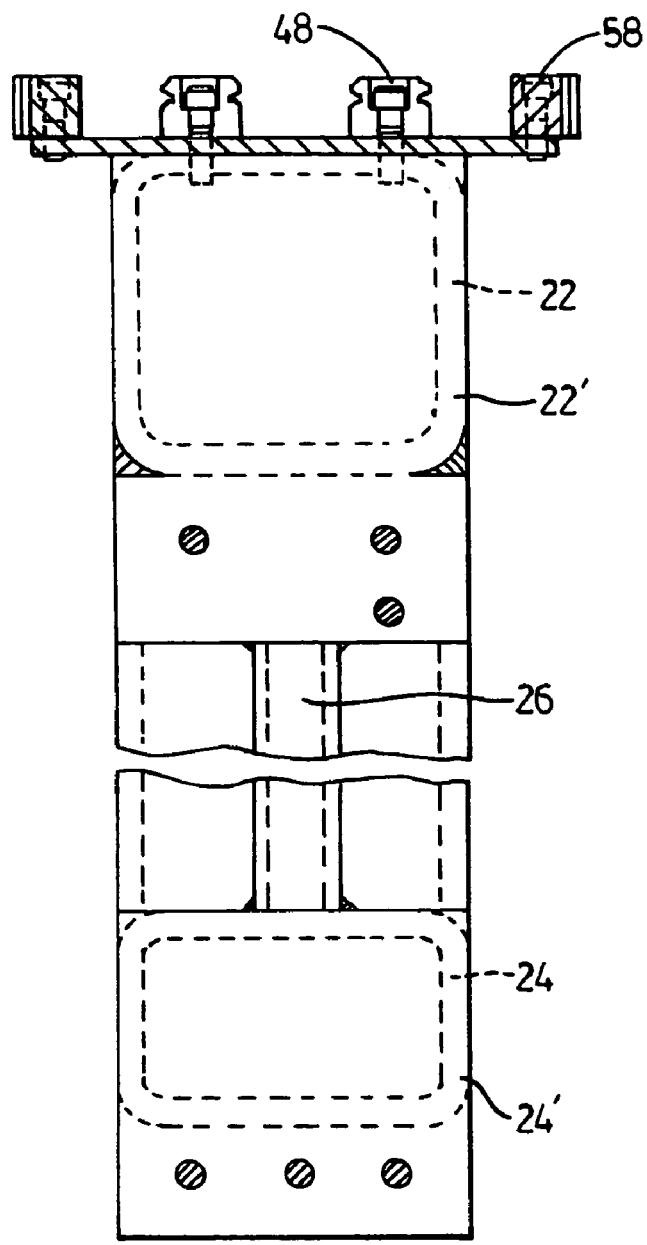
FIG. 13 is a detail elevational end view showing a base frame extension, this view being taken along the line XIII-XIII of FIG. 2B.

Turning now to FIGS. 1A to 3 illustrating the machine 10, the posts 13 of the base frame can be mounted on anchor plates 14. Transversely aligned posts 13 can be rigidly connected together by means of horizontal beams 16. Mounted at one end of the base frame is an electrical box 18, which can be mounted on horizontal support frames 322 connected to the base frame 12. It will be understood that power for the motors and electrical components used in the machine 10 are provided through this box which can be of standard construction. Shown in FIG. 2B is a detachable frame extension 20 which is connected to the side of the base frame 12. It will be understood that there are two of these frame extensions 20 located on one side of the machine 10. Each frame extension includes horizontal tubular frame member 22 which extends outwardly to meet and connect to a sloping frame member 24 (see also FIG. 13). The frame members 22 and 24 are connected by a vertical frame 26. Vertical end plates 22' and 24' for mounting purposes are provided at the inner ends of the frame members 22 and 24. The machine 10 includes two guide supporting devices 28 and 30 which are mounted on the base frame 12. Preferably, one of these guide supporting devices is fixedly mounted on the base frame while the other guide supporting device is mounted for horizontal sliding movement on the base frame in the widthwise direction of the base frame. As illustrated, the guide supporting device 28 is fixed and the guide supporting device 30 is horizontally movable. Preferably, each of these guide supporting devices includes an elongate, horizontal support frame 32 or 32'. As shown in FIGS. 1A and 1B, the horizontal support frame 32 of the supporting device 30 is supported at each end by means of vertical posts 34, 36, each of which is movably mounted at its base. Similarly, the horizontal support frame 32' is connected at each end to a vertical post 38. The bottom of each post 38 can be bolted or attached by screws to the base frame.

Figure 10:
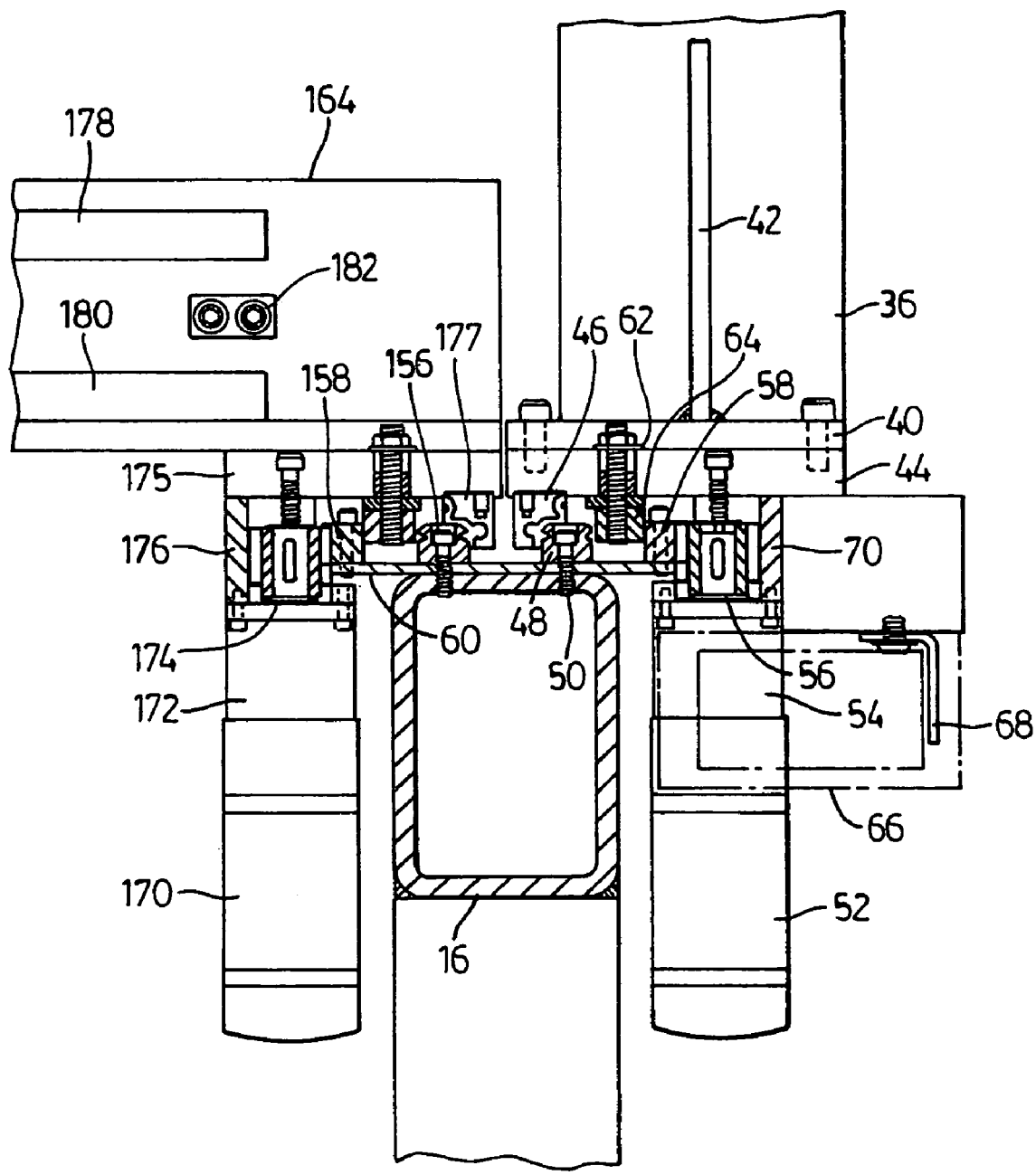
FIG. 10 is a detail elevational view, partly in cross-section, showing servomotor drive arrangements for a power tool supporting beam and a guide supporting frame.

The manner in which the post 36 is mounted for horizontal movement can be seen clearly in FIG. 10. It will be understood that the post 34 is movably mounted in substantially the same manner. The bottom end of the post 36, which can be a tubular member, is welded to a base plate 40 and can be supported thereon by gusset 42. The plate 40 is bolted to a horizontal post mounting plate 44. Mounted on the bottom of the plate 44 are two ball slides 46. These ball slides movably mount the post for horizontal movement on the beam 17, on top of which is an elongate rail 48. The rail can be attached by a series of screws 50. Also mounted to the bottom of the plate 44 is a servomotor 52 which is connected to a straight gear head 54. Operation of the motor 52 rotates a spur gear 56, the teeth of which engage elongate rack 58. The rack 58 is mounted by means of screws to one long edge of horizontal support plate 60 attached by the screws 50 to the top of the beam 16. Mounted on the bottom of the plate 44 by means of screw 62 is a slider assembly 64 which engages the back side of and supports the rack 58 along a section thereof engaged by the gear. Also shown in FIG. 10 in chain-link lines is a cable track 66 which can be supported by means of bracket 68. Between the cable track and the mounting plate 44 is a reducer mounting bracket 70 to which the gearhead is attached by screws. As shown in FIG. 1B, a cable track support 72 is mounted on one side of the post 13 below the cable track 66. This support can be a wide channel member 74 on which can be mounted two angle members 76.

Mounted on top of the posts 34, 36 and on the posts 38 and extending horizontally are tracks 78 each in the form of an elongate beam. Each track is in the form of a hollow, tubular beam that is rectangular in transverse cross-section. Each of the tracks preferably is mounted on top of a respective guide supporting device but it is also possible to mount the tracks differently, for example, from the plant ceiling or an adjacent wall. One of the clamping arm assemblies 29 is mounted on each of these tracks 78 for horizontal movement along its track. Two elongate rails 80 and 82 are mounted on each track 78, the rail 80 being mounted on the inside vertical wall and the rail 82 being mounted on the top. Suitable stops can be mounted at each end of the track to limit the horizontal movement of the clamping arm assembly. Each clamping arm assembly is moved horizontally by means of a servomotor 84 mounted on top of a planetary gearhead 86 that rotates a spur gear 88 about a vertical axis. Gear 88 engages the teeth of an elongate rack 90 mounted on top of the track by a plurality of screws. The gearhead and motor are mounted on top of horizontal support plate 92. Ball slides are mounted on the bottom of the plate 92 for sliding engagement with the top rail 82. Extending downwardly from the support plate 92 and attached thereto by screws is a vertical mounting plate 94. Two ball slides 96 are mounted on the outwardly facing surface of the plate 94 for sliding engagement with the rail 80.

Connected to the inwardly facing surface of the mounting plate 94 is clamping arm member 100 on which is vertically mounted a rail 102. Two aligned ball slides 104 and 105 are mounted on the plate 94 for sliding engagement with the rail 102. In this way, the arm member 100 is mounted for vertical sliding movement during operation of the machine and this movement is powered by pneumatic cylinder 104 and its vertically extending actuating rod 106, the bottom end of which is connected to the arm member 100. The bottom end of the cylinder 104 is rigidly mounted on top of support plate 92. It will be understood that the two clamping arm assemblies 29 are able to clamp and move two window frames or two window sashes horizontally through the machine 10 for processing. Two window frames or window sashes are indicated in chain-link lines at 108 and 110 in FIGS. 2A and 2B. For simplicity, these two frameworks will be referred to as "window frames" in the subsequent description. The window frames are moved by the two clamping arm assemblies 29 along two horizontally extending guide rails indicated at 112 and 114.

Figure 2A:
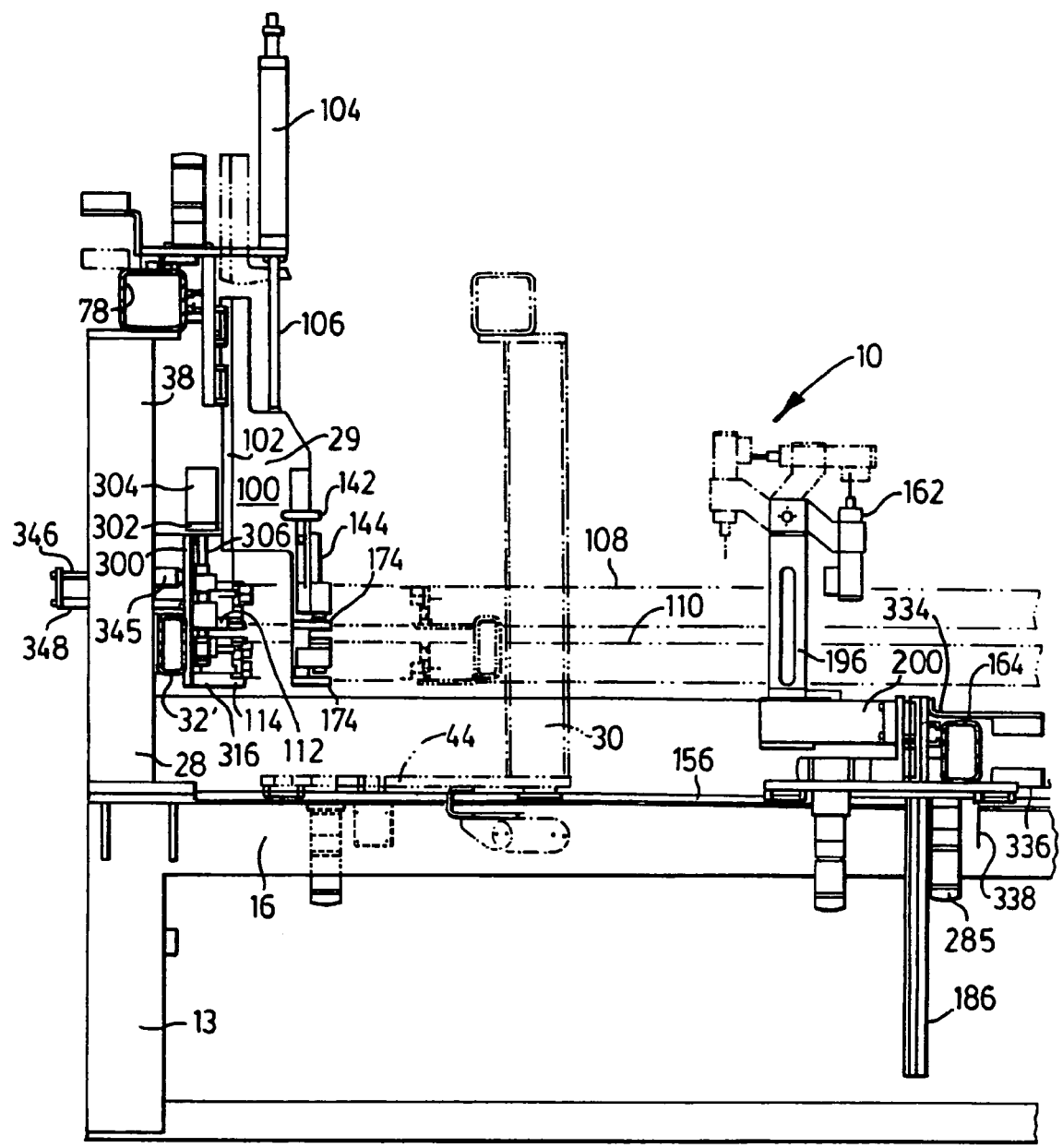
FIGS. 2A and 2B are elevational end views of the apparatus of FIG. 1 with a left hand portion shown in FIG. 2A and a right hand portion shown in FIG. 2B.
Figure 2B:
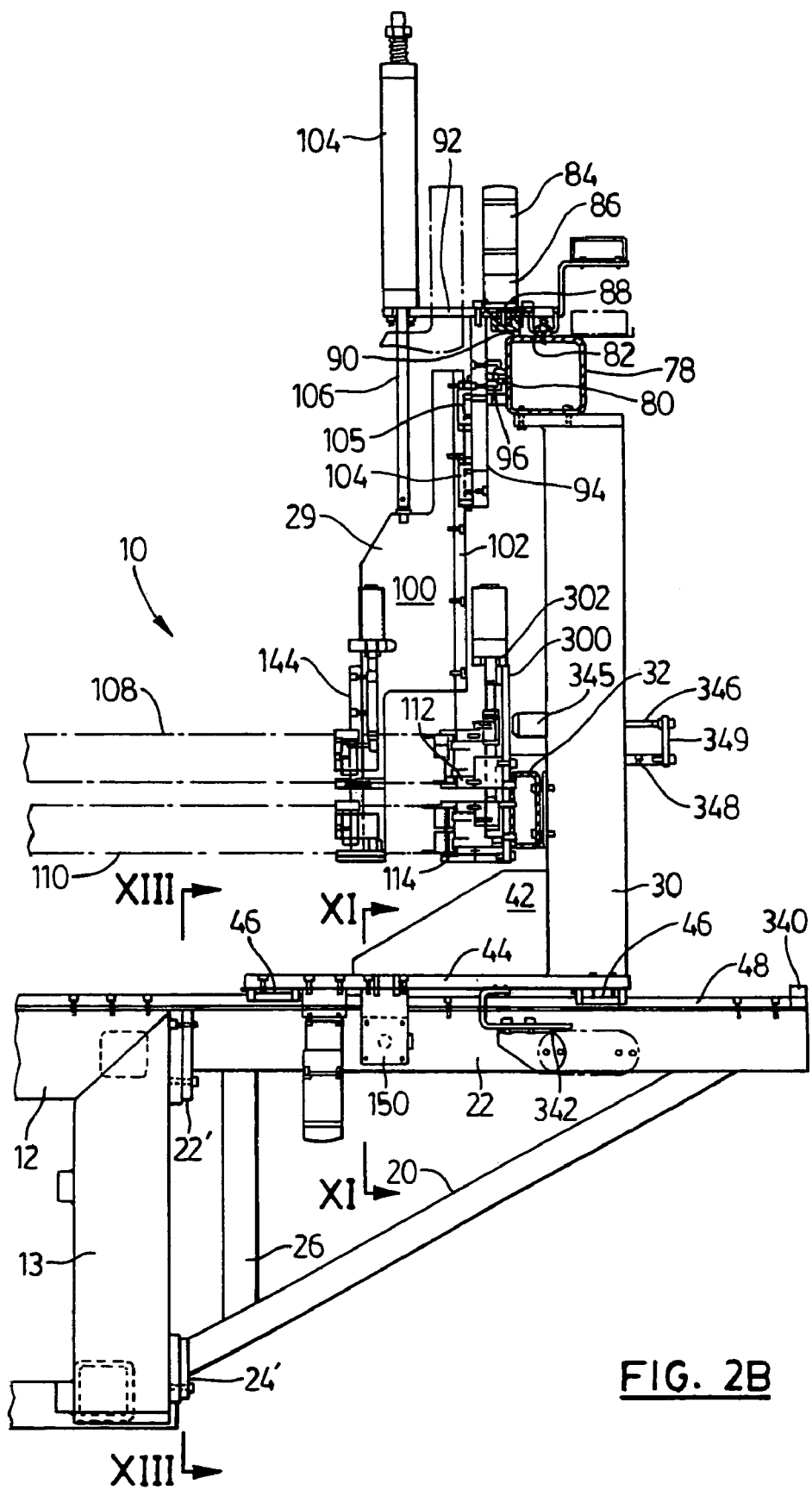
Figure 3:
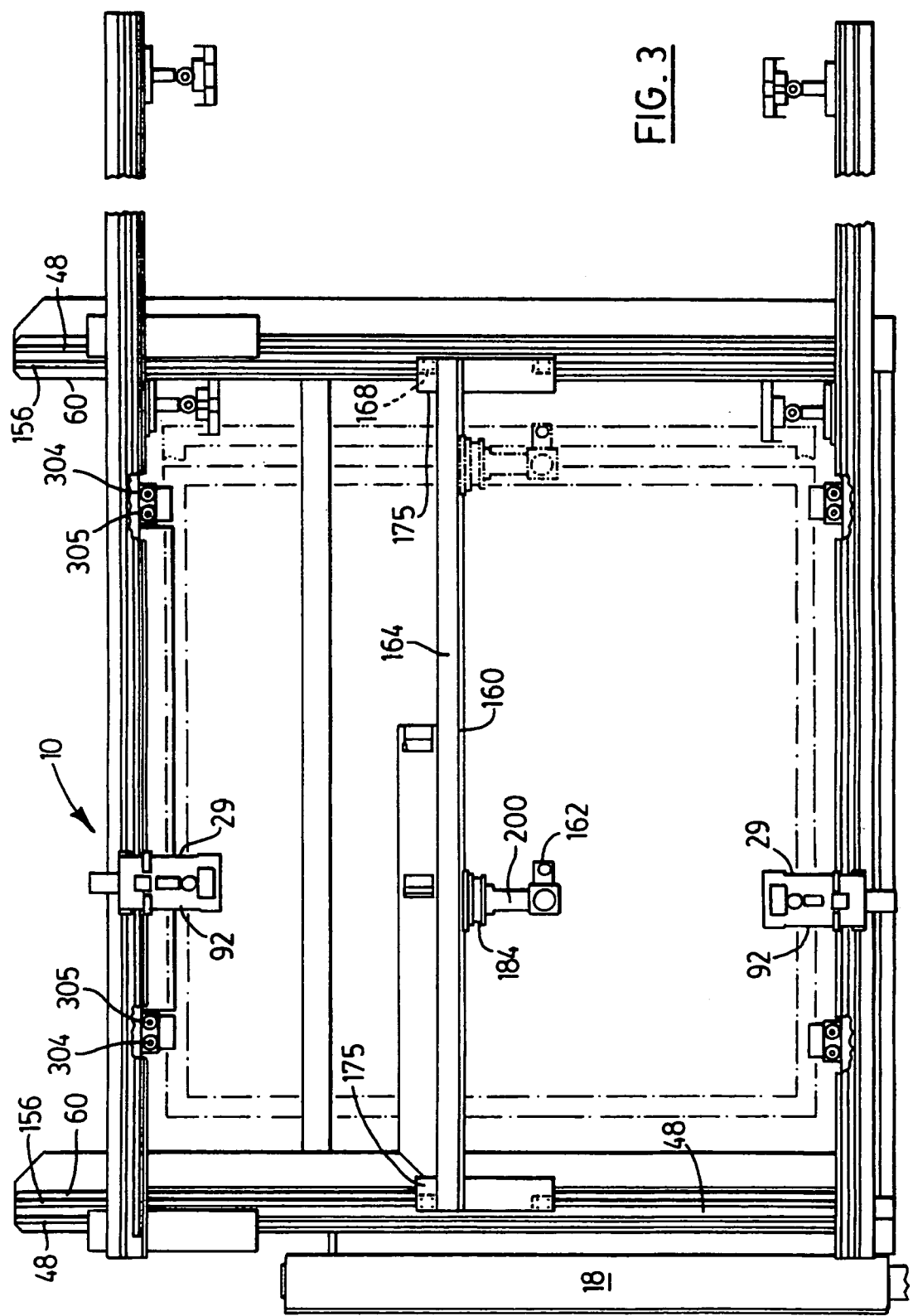
FIG. 3 is a top view of the apparatus of FIGS. 1A, 1B, 2A and 2B with portions of the supporting track cut-out on the left side of the figure for illustration purposes.
Figure 12:
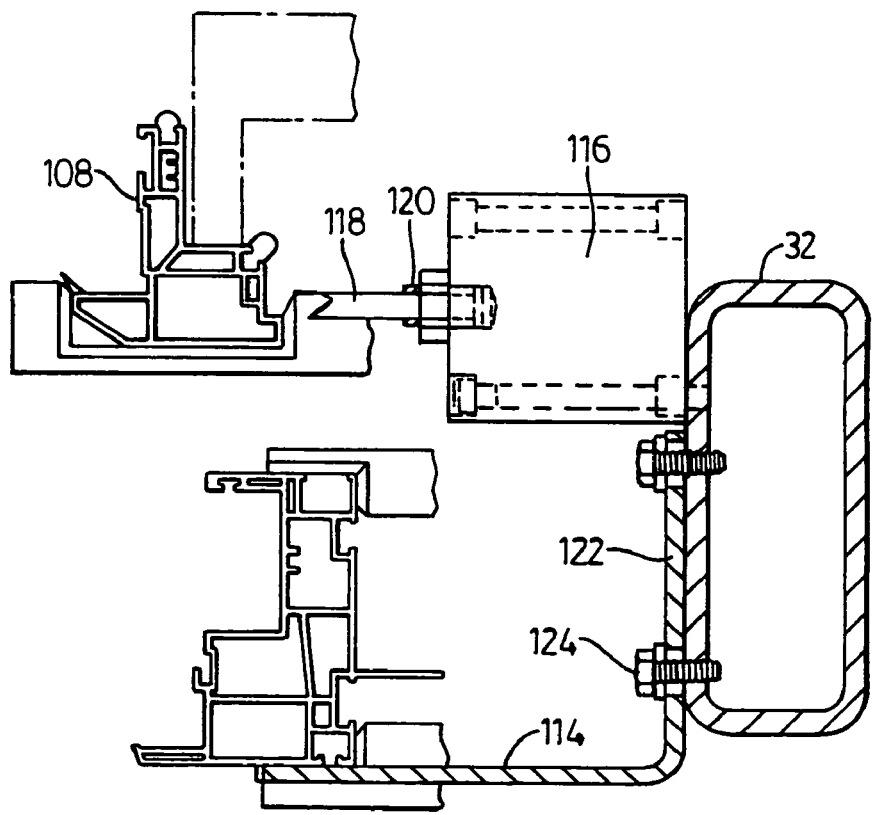
FIG. 12 is a detail elevational view, partly in cross-section, showing another air cylinder actuator for operating a punch, this view taken along the line XII-XII of FIG. 1A.

The guide arrangements 112, 114 are mounted one above the other on horizontal, tubular frame 32 on the right side and on frame 32' on the left side (as seen in FIGS. 2A and 2B). Each guide arrangement 112, 114 preferably includes two, spaced-apart rails that are positioned at the same height. Mounted on the inner vertical wall of the support frame is an air cylinder actuator 116. This optional actuator operates a punch 118 which is detachably connected by punch nut 120. The actuator and punch can be used to punch holes in the upper window frame 108 where required. Also connected to the inner wall of the frame 32 is elongate channel member 122 which is connected by screws 124. A lower guide rail 114 of the lower guide arrangement is formed by the lower horizontal leg of the channel member 122 and an upper guide rail 112 of the upper guide arrangement can be formed in a similar manner by the upper horizontal leg of the channel member. Note that the upper portion of the channel member is not seen in FIG. 12 as it has been cut away to accommodate the actuator 116.

Turning now to the clamping mechanism on the clamping arm assembly, this mechanism has some features similar to that described and illustrated in applicant's co-pending U.S. patent application Ser. No. 10/716,344 filed Nov. 18, 2003, the specification and drawings of which are incorporated herein by reference. Each gripping arm assembly has two grippers or gripping devices 174 arranged one above the other and positioned at the lower end of the arm member 100. The devices 174 are connected to selectively clamp the window frames when required either for the aforementioned horizontal movement or to hold them firmly for machining operations. It will be understood that each of the arm members 100 on which the grippers are mounted is movable vertically to allow the grippers to pass over the frameworks during processing in the machine 10. Each gripper includes an upper gripper assembly 220 and a horizontal gripper plate 222. The upper gripper plate 222 is attached by a screw to the arm member 100 while the lower gripper plate is attached by one or more screws to the bottom end of the arm member. Each upper gripper assembly 220 includes a central support member 130 and two side extensions 132 and 133 which are attached by screws to the central support member. Each upper gripper assembly can be moved upwardly or downwardly relative to its gripper plate 222 for the purpose of gripping a section of the window frame. In particular, the uppermost assembly 220 is moved vertically by means of actuating rod 138 which is on the right side as seen in FIG. 1A. This rod extends downwardly from its pneumatic actuator cylinder 140 which is mounted on horizontal support plate 142. The lower assembly 220 is moved by a left actuating rod 134 which extends downwardly from its pneumatic actuator cylinder 136. Each of the upper gripper assemblies 220 is slidably mounted on its arm member by means of vertical rail 144. A ball slide is used to mount each upper gripper assembly 220 for vertical movement on the rail 144. A suitable industrial computer can be provided to control the various required movements of the arm assemblies 29 and their respective grippers during operation of the machine.

Figure 11:
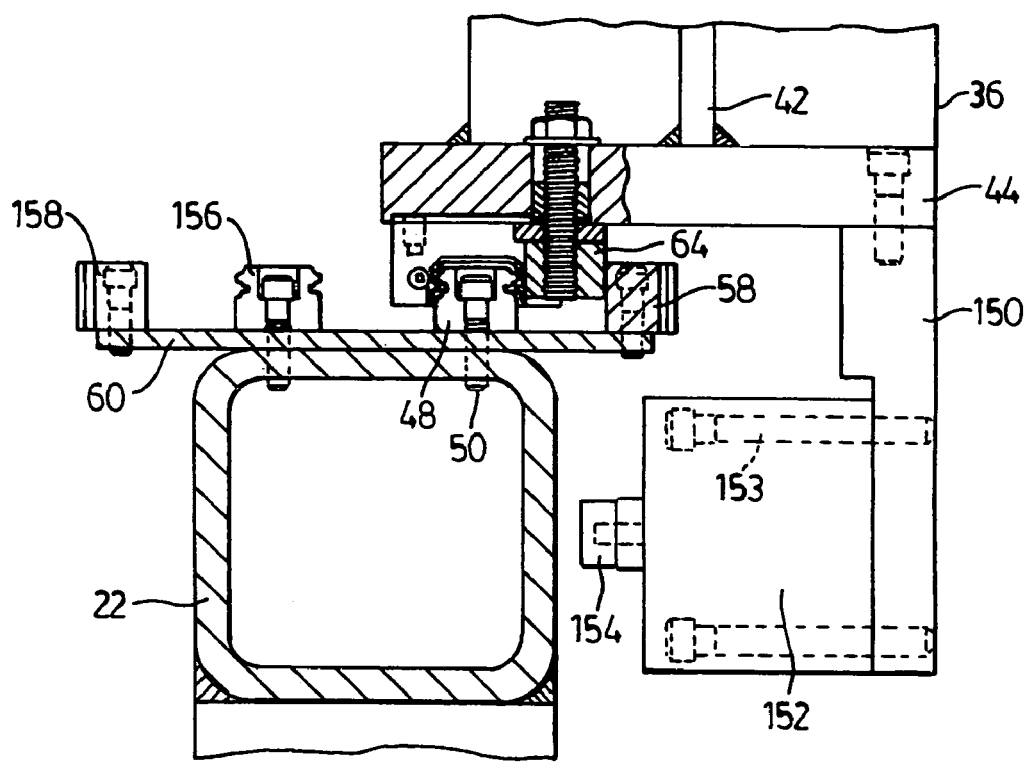
FIG. 11 is another detail elevational view, partly in cross-section, showing an air cylinder actuator mounted below a post of the guide supporting frame, this view being taken along the line XI-XI of FIG. 2B.

Turning now to the detail view shown in FIG. 11, there is mounted on the outer edge of the mounting plate 44 a cylinder mounting bracket 150 which is attached by screws. Mounted on the inside surface of this bracket is an air cylinder actuator 152 connected by screws 153. Projecting inwardly from this actuator and movable towards the tubular horizontal beam 22 is a carbide tipped gripper 154. It will be understood that the actuator 152 can move the gripper into engagement with the adjacent side of the beam 22 in order to lock the movable guide supporting device 30 in place and to increase the rigidity of this support frame. In other words, the actuator 152 and the gripper 154 form a type of brake for the bridge apparatus that includes the vertical posts 34, 36. The use of this brake arrangement when the bridge is not moving causes the bridge to be held rigidly in position for machining operations. Also shown clearly in FIG. 11 is a second rail 156 which is also mounted on top of the beam 22 extends along the top of the base frame. Mounted adjacent to this rail and spaced therefrom is another rack 158, the function of which is explained below.

The machine 10 includes a tool supporting mechanism indicated generally at 160. This mechanism supports in a movable manner at least one power tool for carrying out machining operations on the frameworks, ie. the window frames. In the illustrated machine, this power tool comprises a drill unit 162 which is shown in various positions in FIG. 2A. The tool supporting mechanism includes a horizontal support beam or bridge 164 which is shown lengthwise in FIGS. 1A and 1B and in vertical cross-section in FIG. 2A. In one preferred embodiment of the machine, the beam 164 is approximately ten feet in length. Preferably the beam is provided with an end cover 166 at each end. The beam 164 is mounted for horizontal sliding movement on the base frame 12 in the widthwise direction of the base frame. In particular, the beam is slidably mounted on the two elongate rails 156 by means of ball slides 168. Two servomotors 170 provide the power to move the beam 164 horizontally. As shown in FIG. 10, each servomotor is connected to a planetary gear box 172 which is connected to spur gear 174 that rotates about a vertical axis. This spur gear engages the aforementioned rack 158 that is connected by screws to the edge of horizontal plate 60. The top of the gear head is mounted to horizontal plate 175 by connecting bracket 176. The ball slides 168 are mounted on the bottom of the plate 60 at opposite ends thereof. The two servomotors 170 located at opposite ends of the beam are able to rotate their respective spur gears 174 and the engagement of these spur gears with their respective racks 158 causes a controlled horizontal movement of the beam 164. Of course, operation of the two servo motors 170 is coordinated so that they will always operate at the same time and at the same speed.

Mounted on one side of the beam 164 are two long horizontal rails 178 and 180 which are attached by screws. Located at opposite ends of these rails are suitable stops 182 to limit horizontal movement on the rails. Also mounted on the horizontal beam 164 is a transporting mechanism indicated generally at 184. The transporting mechanism supports the at least one power tool, for example, the aforementioned drill unit, and is capable of moving at least one power tool both horizontally in the lengthwise direction of the base frame and vertically relative to the base frame 12. The illustrated preferred transporting mechanism includes a vertical support plate 186 which is shown in solid lines in a central position on the machine in FIG. 1A and in alternative positions in chain-link lines in FIGS. 1A and 1B. The plate 186 is movably mounted on the rails 178, 180 by means of four ball slides 188, two engaging each rail. These ball slides can be seen most clearly in FIG. 4. Extending vertically on the plate 186 and connected thereto are two parallel, vertical rails 190, 192. Mounted on these two rails is a tool supporting carriage unit indicated generally at 194 and shown in FIGS. 4, 7 and 8. This carriage unit is mounted for vertical movement on the support plate 186. The preferred carriage unit 194 includes a vertically extending, hollow post 196, sometimes referred to herein as a first support structure, on which a lever member 198 is mounted for pivotable movement about a horizontal pivot axis indicated at A in FIG. 8. The lever member 198 supports the power tool, ie. the drill unit 162, at a location spaced away from this pivot axis A. The post or first support structure 196 is mounted for rotation about a substantially vertical axis on a horizontally extending, second support structure. In the illustrated preferred embodiment, the second support structure is a gear housing which is attached by screws to vertical mounting plate 202. Four ball slides 204 are mounted on one side of the plate 202 for sliding movement along the rails 190, 192, two ball slides engaging each rail.

Figure 5:
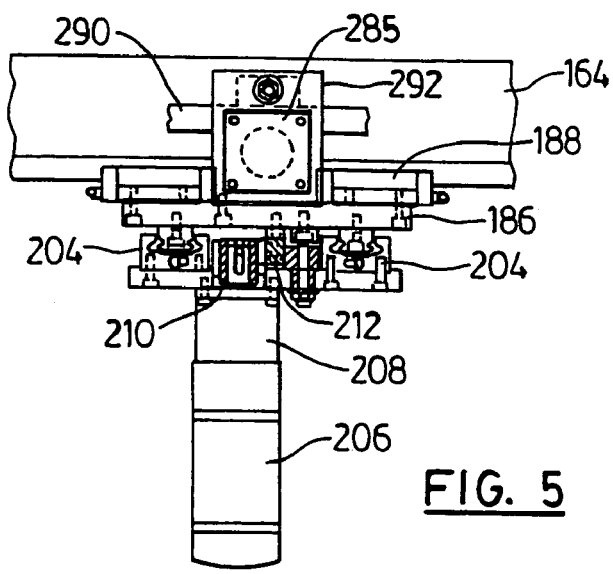
FIG. 5 is a top view of the main mounting plate of FIG. 4, this view also showing a movable tool supporting plate mounted on the main mounting plate and a drive motor for moving the tool supporting plate vertically.

There is a drive motor system for moving the plate 202 vertically on the rails 190, 192 and this drive system includes a further drive motor 206 and gear head 208. The motor 206 can be a standard servomotor such as that sold by Mitsubishi, Model HC-PQ43. The gearhead 208 can also be a planetary gear head such as one sold by Gear Max, Model 23GM010 having a ratio of 10:1. The servomotor 206 preferably is provided with a brake. The gearhead is operatively connected to a spur gear 210 shown in FIG. 5 and the teeth of this gear engage a rack 212 that is mounted by screws to the support plate 186. A spacer can be provided between the rack and the plate 186 to correctly locate the rack.

Figure 4:
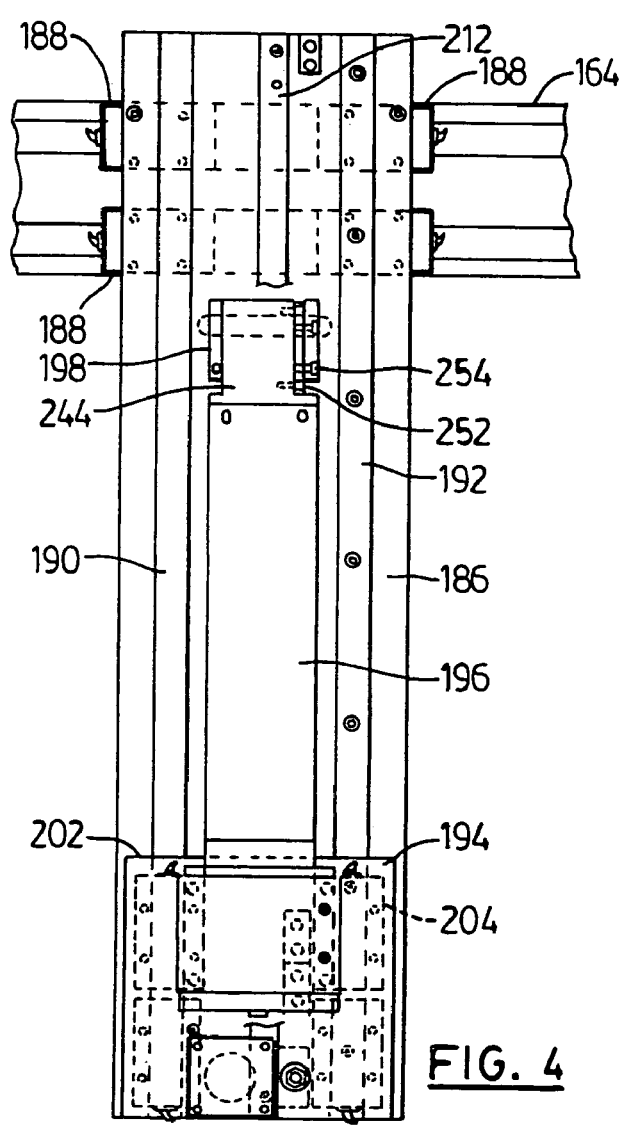
FIG. 4 is a side view of a vertically extending main mounting plate and support post for a power tool used in the apparatus.
Figure 6:
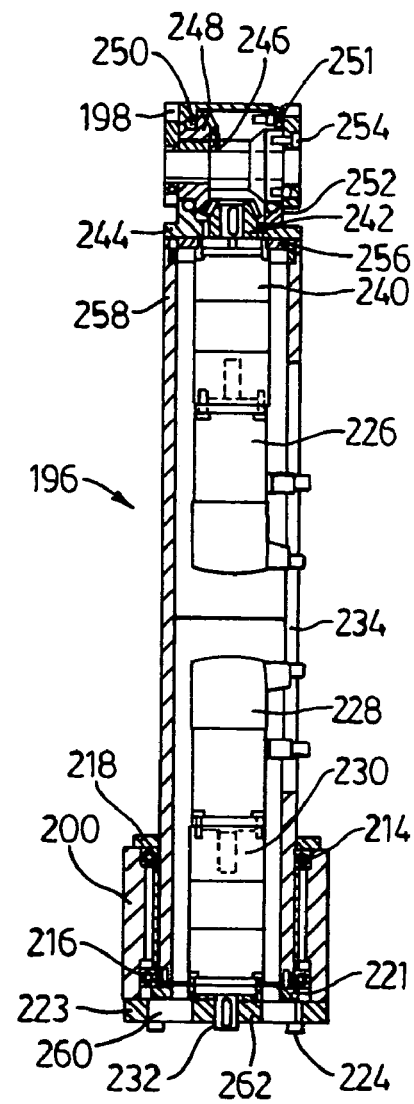
FIG. 6 is an elevational view, partly in cross-section, illustrating the vertically extending structure or support post on which the aforementioned power tool is pivotably mounted.

Turning now to the construction of the post 196 and the supporting arrangement therefor, particular reference will be made to FIGS. 4 and 6. Firstly, it will be seen that the hollow post has a circular horizontal cross-section and it is rotatably mounted in the gear housing or second support structure 200. Arranged in the gear housing are two sets of ballbearings 214 and 216. The upper ballbearing set is protected by an annular cover 218 which can be held in place by a key (not shown). The bottom set of ballbearings is supported by annular bearing cover 221 which can be attached by screws to the bottom end of the post. Attached to the bottom of the gear housing is a cover member 223 which can be detachably connected by means of four screws 224 (only two of which can be seen in FIG. 6). Optionally, there can be provided in the bottom cover 222 a C-shaped opening 260. This opening surrounds on three sides a tongue-like extension 262 of the cover 223.

Figure 7:
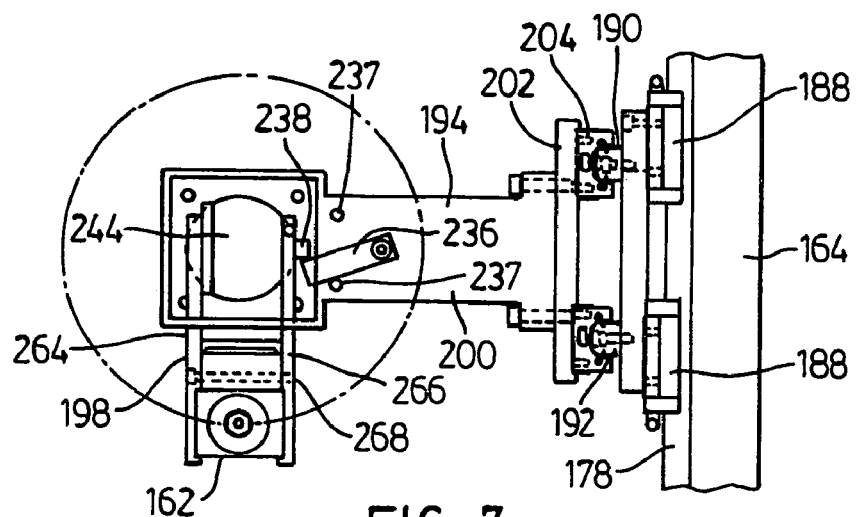
FIG. 7 is a top view of the post shown in FIG. 6 and the support therefor with the power tool mounted on the top end of the post.
Figure 8:
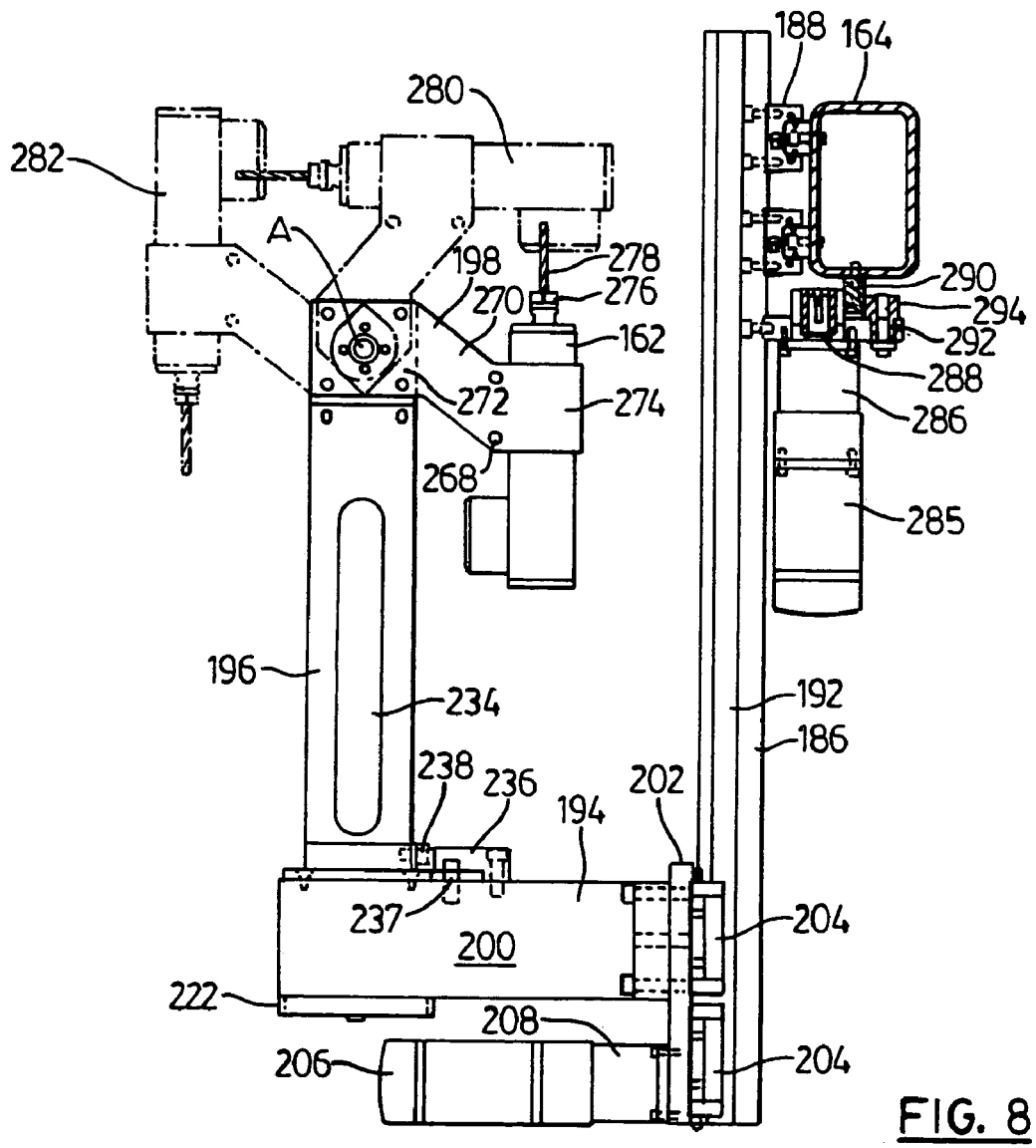
FIG. 8 is a side elevation of the aforementioned support post and the support therefor, this view also showing the power tool in several different positions.

Mounted in the post are two servomotors 226 and 228 arrange done above the other and each attached to its own gear head. Each of these motors can, for example, be one sold by Mitsubishi, Model HC-KFE13. The gear box can have a ratio of 30:1 in each case and can, for example, be that made by Apex Dynamics, Model AB042-S2-P2. The lower gear box 230 has an output shaft 232 at its bottom end which extends into a hole in the cover 222 and is fixedly connected thereto. In this way, operation of the servomotor 228 will cause the post 196 to rotate about its vertical axis and to rotate relative to the support structure 200. Electrical power to both servomotors is provided through a vertical slot 234 in one side of the post. As shown in FIG. 8, there can be provided at one side of the post a pivoting stop member 236 which is attached to the gear housing by a shoulder screw. Pivotal movement of the member 236 is limited by two pins 237 mounted in the top of the gear housing. This stop member limits the amount of rotation of the post above its vertical axis in both directions as can be seen in FIG. 7. At each maximum extent of rotation, this stop member engages the head of a screw 238 attached at one side of the post.

The upper gear box 240 on which the upper servomotor 226 is connected, is itself connected to a bevel gear 242 which rotates about a vertical axis. This bevel gear extends through a hole in an upper bearing housing 244. The aforementioned lever member 198 is pivotably mounted on this bearing housing. Pivotably mounted for rotation about a horizontal axis in the bearing housing is a short axle 246. Mounted on this axle for rotation therewith is a bevel gear 248 rotatably mounted by means of ball bearing 250. A similar ball bearing 251 is provided at the opposite end of the axle to support this end of the axle. The bearing 251 is held by bearing cover 252 attached to the housing by suitable screws. The adjacent end of the lever member 198 is attached by screws 254 to the wide end of the axle. The reducer or gear box 240 can be mounted by means of screws on flange 256. Additional screws, not shown, can extend through the side of the post at 258 to engage the corners of the gear box 240, if desired. It will thus be seen that operation of the motor 226 will cause the bevel gear 248 to rotate about a horizontal axis and the attached axle will therefore rotate the lever member 198 and the drill unit attached thereto. In order to increase the rigidity of the connection between the lever member 198 and the wide end of the axle 246, two dowel pins (not shown) can be used and these extend in a tight fitting manner between the end of the lever member 198 and the wide end of the axle.

Turning now to the preferred construction of the lever member 198, as shown in FIGS. 7 and 8, the lever member comprises two similar arm sections 264 and 266 which are in parallel, spaced-apart vertical planes. These arm sections are pivotably mounted on opposite sides of the bearing housing. They can also be connected to each other by means of two screws 268. By loosening these screws, the drill unit 162 can be inserted between the two arm sections and then clamped in place by tightening the two screws. The preferred arm sections each have a central section 207 that extends at an angle to lever end sections 272 and 274. In this way, the nut and collet at 276 which are used to hold drill bit 278 are located at about the same height as the top of the bearing housing 244 when the drill unit is positioned to drill upwardly, this position being shown in solid lines in FIG. 8. Alternative drilling positions shown in FIG. 8 include a horizontal drilling position 280 and a downwards drilling position 282, both of which can be achieved by rotating the lever member 198 about the horizontal axis A.

Also shown in FIG. 8 is a further servomotor 285 which is connected at the top to planetary gear head 286. This gear head can have a 10:1 ratio and can, for example, be one made by Gear Max, Model 23GM010. This servomotor is used to turn a spur gear 288 which engages a rack 290 extending along the bottom of the beam 164. It will be appreciated that the servomotor 285 and the gear head 286 comprise part of a servomotor drive system for controllably moving the vertical support plate 186, sometimes referred to herein as the third support structure, horizontally along the beam 164. The servomotor and its gear head are mounted on the support plate 186 by means of reducer mounting plate 292 which is attached by screws. Also mounted on the plate 292 is a slider assembly 294 attached by two hex nuts and washers. The slider assembly engages the surface of the rack 290 opposite the spur gear.

Additional features shown in FIGS. 2A and 2B include vertical support plate 300 mounted on the inwardly facing surface of each of the horizontal beams 32, 32'. Mounted by screws on top of this plate is a cylinder mounting plate 302 on which is mounted a pair of air cylinders 304 and 305. These are pneumatic actuators that operate two actuator rods 306 and 307. The actuator 307 is connected to top clamp bracket 308. The longer actuator rod 306 is connected to bottom clamp bracket 310. Both of these brackets are slidably mounted on vertical rail 312 which is mounted on the support plate 300. Located between the two clamp brackets is a top support bracket 314. Mounted fixedly at the bottom of the plate 300 is a bottom support bracket 316. It will be appreciated that by operation of the air cylinder actuator 305, the upper clamp bracket can be used to clamp a window frame between this bracket and the top support bracket 314. Similarly, by operation of the air cylinder actuator 304, the bottom clamp bracket 310 can be used to clamp the lower window frame between it and the bottom support bracket 316. It should also be noted that there are two of these clamping arrangements located along each of the horizontal beams 32, 32'. These clamping arrangements can be used to hold both the lower and the upper window frames rigidly and firmly when they have been moved into position for one or more machining operations.

Mounted at each end of the track 78 is a stop 324 to limit the horizontal movement of the clamping arm assembly. A cover plate 326 can be provided at each end of the track. Also mounted on the track near one of the stops is an actuator 328. The actuator 328 operates a proximity switch of standard construction. This switch is used to indicate to the computer control system that the gripper arm assembly has reached this position near the end of the track 78. It should also be appreciated that a substantial length of the track 78 has been omitted at 330 in FIG. 1 B. In fact, in one preferred embodiment of the machine, the projecting extension of the track beyond the post 36 is about 104 inches. Thus, both tracks are able to extend substantially over the region of the four corner welder, thus permitting the clamping arm assemblies to clamp the required sections of the two window frames formed by the welder and move them onto the two pairs of rails on the machine 10. Also visible in FIG. 1A is another cable track bracket 332 mounted on one side of the post 13.

With reference now to FIG. 2A, an additional item that can be mounted on the top of the vertical plate 186 is a cable track support bracket 334. Another cable track support bracket can be mounted below the bracket 334 at 336. A stiffener sheet can be mounted on one vertical surface of the beam 164 by means of screws. This sheet 338 extends along and below the beam as shown and it makes the beam 164 more rigid in the vertical plane. It can extend the whole length of the beam 164 and, in one embodiment, the sheet has a thickness of $93/1000$ths of an inch. Shown in FIG. 2B is a stop 340 located at the end of each rail 48 in order to limit movement of the guide supporting device or support frame 30. Another cable track bracket 342 can be attached to the bottom of the mounting plate 44.

Figure 15:
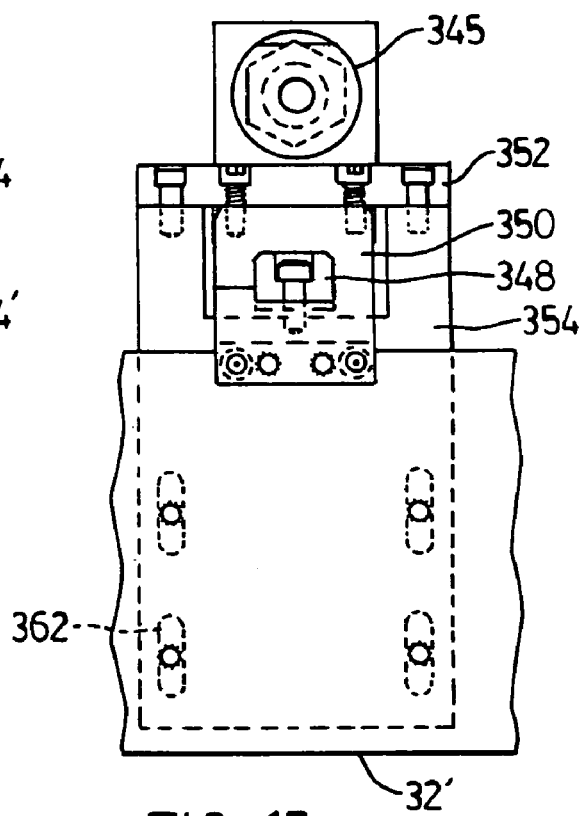
FIG. 15 is a detail end view of the actuator arrangement of FIG. 14, this view being taken from the right side of FIG. 14.
Figure 14:
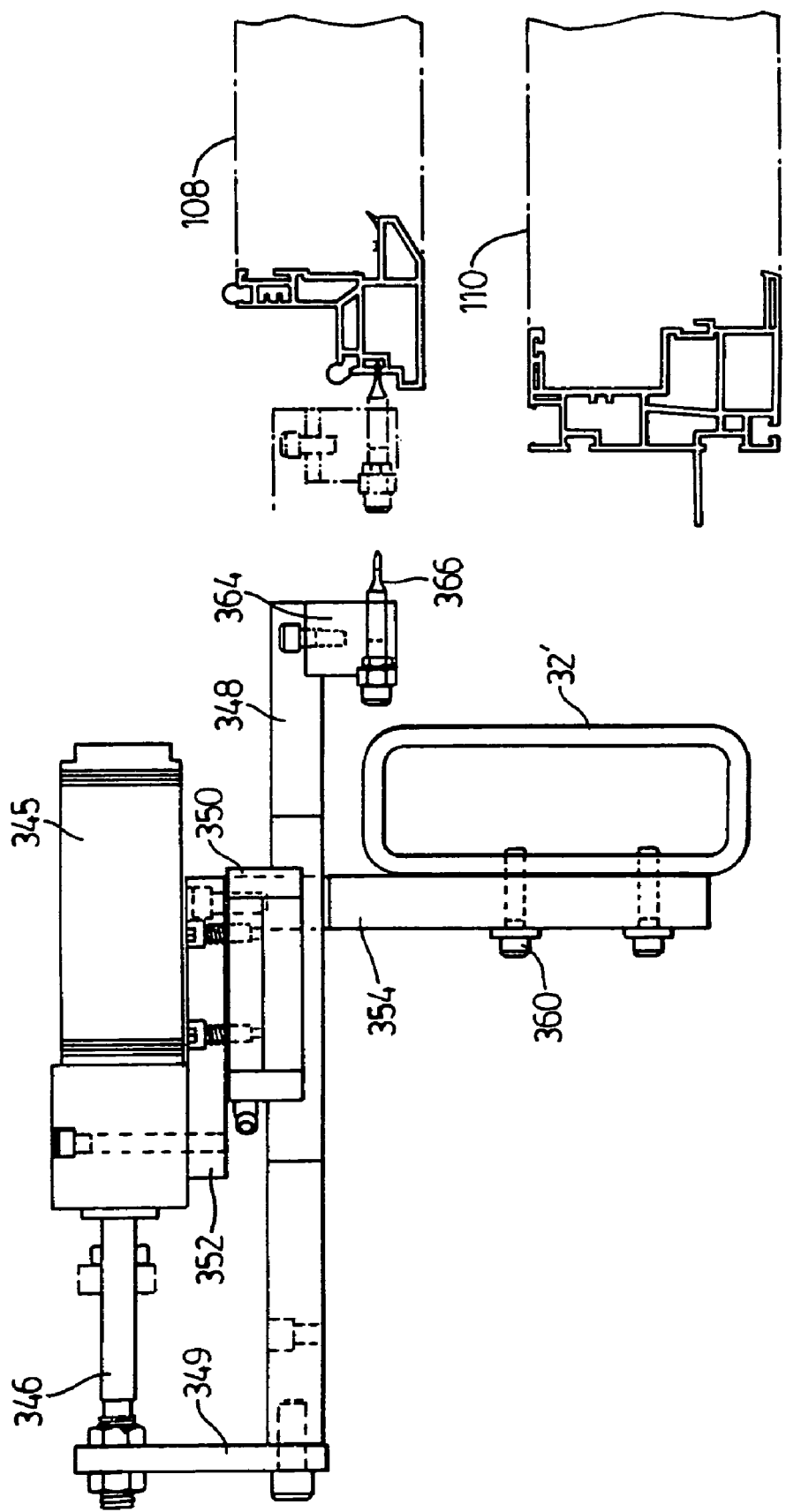
FIG. 14 is a detail elevational view showing an air cylinder actuator and a punch operated thereby, this view taken along the line XIV-XIV of FIG. 1A.

Turning now to FIGS. 14 and 15 of the drawings, these detail views show an air cylinder actuator 345 that has a horizontal central axis and an actuator rod 346. The air cylinder is mounted on vertical support plate 354 by means of its mounting plate 352 and screws. The outer end of the actuator rod 346 is connected by means of vertical connector 349 to movable horizontal rail 348. The movement of this rail is guided by means of ball slide 350 attached by screws to the bottom of mounting plate 352. Support plate 354 is attached by screws to the side of the horizontal support beam 32'. Preferably the plate 354 is adjustable vertically because the attachment screws 360 extend through slots 362 that are elongated vertically. Mounted to the inner end of the rail 348 is a punch housing 364 that can be used to hold a punch 366. As illustrated in FIG. 14, the punch 366 can be moved horizontally by means of the actuator cylinder 345 to punch holes in the outside surface of upper window frame 108. The described punch and punch operating mechanism can be provided on both sides of the machine 10 as shown. Thus, the preferred illustrated machine is equipped with several power tools, including the drill unit which is movable in several different ways and the two punch mechanisms. It will be readily apparent to those skilled in this art that additional power tools can be provided on the machine 10 to carry out additional processing operations, if desired.

It will be appreciated by those skilled in the manufacture of window frames and window sashes, particularly those made from plastic profiles, that various modifications can be made to the described and illustrated processing machine and to the described method for manufacturing plastic frame works using this machine without departing from the spirit and scope of this invention. Accordingly, all such modifications and changes as fall within the scope of the appended claims are intended to be part of this invention.

What is claimed:

1. A machine for carrying out machining operations on two rectangular frameworks arranged one above the other and extending horizontally, said machine using at least one power tool and comprising:
    a machine base having a length and a width, both extending in a horizontal direction;
    two framework guide supporting devices mounted on said base frame, each guide supporting device including an elongate horizontal support frame mounted on said base frame;
    two horizontally extending guide arrangements mounted one above the other on each horizontal support frame, said guide arrangements being adapted to guide and support respectively said two rectangular frameworks for intermittent horizontal movement relative to said machine in the lengthwise direction of the base frame;
    a tool supporting mechanism including a horizontal support beam mounted for sliding movement on said base frame in the widthwise direction of said base frame;
    at least one power tool for carrying out machining operations on said frameworks; and
    a transporting mechanism mounted on said horizontal support beam, supporting said at least one power tool, and capable of moving said at least one power tool both horizontally on said support beam in said lengthwise direction of the base frame and vertically relative to said base frame and said support beam;
    wherein during use of said machine, said at least one power tool can carry out one or more machining operations on said two frameworks and said two frameworks are supported one above the other on said two guide arrangements.

2. A machine according to claim 1 wherein one of the horizontal support frames is mounted for horizontal sliding movement on said base frame in the widthwise direction of said base frame.

3. A machine according to claim 2 including two parallel, horizontal tracks each of which is mounted on top of its respective guide supporting device and two clamping arm assemblies each mounted on a respective one of said tracks for horizontal movement along its track, each clamping arm assembly being adapted to clamp said two frameworks and to move said two frameworks along said guide arrangements during operation of said machine.

4. A machine according to claim 2 wherein each of said guide arrangements is a pair of substantially horizontal rails spaced horizontally apart a selected distance corresponding closely to one dimension of the two frameworks and said machine further includes clamping devices for firmly and temporarily holding a respective one of said two frameworks arranged along each pair of the rails.

5. A machine according to claim 4 wherein said tool supporting mechanism includes a horizontal support beam mounted for horizontal sliding movement on said base frame in the widthwise direction of the base frame.

6. A machine according to claim 1 wherein said transporting mechanism includes a vertical support plate mounted for horizontal sliding movement on said support beam and a tool supporting carriage unit mounted for vertical sliding movement on said vertical support plate.

7. A machine for carrying out machining operations on rectangular frameworks using at least one power tool, said machine comprising:
   a machine base frame having a length and a width;
   at least one framework guide supporting device mounted on said base frame;
   two horizontally extending guide arrangements mounted one above the other on said at least one supporting device, said guide arrangements being adapted to guide and support respectively two of said rectangular frameworks for intermittent horizontal movement relative to said machine in the lengthwise direction of the base frame;
   a tool supporting mechanism including a horizontal support beam mounted for sliding movement on said base frame in the widthwise direction of the base frame;
   at least one power tool for carrying out machining operations on said frameworks, said at least one power tool comprising a drill unit assembly including a drill bit holder and a motor for rotating a drill bit mounted in said drill bit holder; and
   a transporting mechanism mounted on said support beam, supporting said drill unit assembly, and capable of moving said drill unit assembly both horizontally in the lengthwise direction of the base frame and vertically relative to said base frame, said transporting mechanism including a vertical support plate mounted for horizontal sliding movement on said support beam and a tool supporting carriage unit mounted for vertical sliding movement on said vertical support plate,
   wherein said carriage unit includes a support arm having said drill unit assembly mounted thereon and pivotable about a horizontal axis in order to change the drilling orientation of said drill unit assembly.

8. A machine according to claim 7 wherein said carriage unit includes an upright post rotatable about a vertical axis and a gear housing in which said post is rotatably mounted, said support arm being pivotably mounted at a top end of the upright post.

9. A machine according to claim 8 wherein one end of said gear housing is attached to a vertical mounting plate slidably mounted on said support plate, a vertical drive motor is mounted on said vertical mounting plate and is operatively connected to a spur gear for rotating same, and a vertically extending, toothed rack is mounted on said support plate for engagement with said spur gear in order to provide drive means for raising or lowering said carriage unit and the drill unit assembly.

10. An apparatus for carrying out machining operations on a workpiece, said apparatus comprising:
   a tool carriage mechanism adapted for mounting on a support member and movable with respect to said support member, said tool carriage mechanism including a base unit mountable on said support member, a support post having one end rotatably mounted on or in said base unit, a first drive motor unit capable of rotating said support post about a central longitudinal axis of said post, a vertical main mounting plate on which said base unit is movably mounted, and a drive motor mechanism adapted for moving said base unit on said main mounting plate;
   a power tool for carrying out machining operations, said power tool including a second drive motor and a tool rotatable by said second drive motor;
   a support arm pivotable about a transverse axis that is substantially perpendicular to said central longitudinal axis, said support arm being mounted on a second end of said support post which is opposite said one end and said power tool being mounted on a section of said support arm spaced away from the support post; and
   a third drive motor unit capable of pivoting said support arm and the attached power tool about said transverse axis, said third drive motor unit including a servomotor mounted in said support post, a first bevel gear rotatable by said servomotor, and another bevel near mounted on a horizontal shaft and driven by said first bevel gear, said support arm being fixedly connected to said horizontal shaft which extends along said transverse axis and is rotatably supported on top of said support post.
   wherein said support arm and third drive motor unit can be used to change the operating orientation of said power tool during use of said apparatus and said drive motor mechanism includes a fourth motor mounted on said base unit.

11. An apparatus for carrying out machining operations on rectangular frameworks, said apparatus comprising:
   a tool carriage mechanism adapted for mounting on a support member and movable with respect to said support member, said tool carriage mechanism including a base unit mountable on said support member, a support post having one end rotatably mounted on or in said base unit, and a first drive motor unit capable of rotating said support post about a central longitudinal axis of said post, said base unit including a gear housing having a longitudinal central axis, which extends horizontally, and a vertical mounting plate attached to an end of said gear housing and fitted with ball slides for facilitating vertical movement of the gear housing and the mounting plate, said one end of said support post extending into said gear housing and said first drive motor unit being operatively connected by a drive shaft attached to said gear housing, wherein said central longitudinal axis of said support post is a vertical axis, said support post comprises a substantially hollow tube, and said first drive motor unit is mounted substantially in a lower section of the hollow tube;
   a power tool for carrying out machining operations, said power tool including a second drive motor and a tool rotatable by said second drive motor;
   a support arm pivotable about a transverse axis that is substantially perpendicular to said central longitudinal axis, said support arm being mounted on a second end of said support post which is opposite said one end and said power tool being mounted on a section of said support arm spaced away from the support post; and
   a third drive motor unit capable of pivoting said support arm and the attached power tool about said transverse axis,
   said third drive motor unit being mounted substantially in an upper section of said hollow tube, wherein said support arm and third drive motor unit can be used to change the operating orientation of said power tool during use of said apparatus.

12. An apparatus according to claim 11 wherein said power tool is a drilling unit assembly including a drill bit holder and said support arm is pivotable through an angle of at least 180 degrees about said transverse axis.

13. An apparatus according to claim 11 wherein said tool carriage mechanism further includes a support beam adapted to extend horizontally along a longitudinal beam axis and to move horizontally in a direction perpendicular to said longitudinal beam axis, and a vertical main mounting plate mounted for horizontal movement on said support beam in a direction parallel to said longitudinal beam axis, said first mentioned mounting plate being movably mounted on said main mounting plate by means of said ball slides.

14. An apparatus according to claim 13 including a further drive motor mounted on said main mounting plate and adapted to rotate a further spur gear and a toothed rack mounted on and extending lengthwise along said support beam, said further spur gear engaging said rack so that a selected amount of rotation of said further spur gear causes said main mounting plate to move horizontally along said support beam a desired distance during use of said apparatus.

15. An apparatus for carrying out machining operations on plastic frameworks, said apparatus comprising:
    a power tool for carrying out machining operations on one of said plastic frameworks, said power tool including a first drive motor and a tool device operatively connected to and adapted to be driven by said first drive motor;
    a lever member pivotable about a first horizontal pivot axis and supporting said power tool at a location spaced away from said pivot axis;
    a vertically extending, first support structure on which said lever member is mounted for pivotable movement about said horizontal pivot axis;
    a horizontally extending, second support structure on which said first support structure is mounted for rotation about a substantially vertical axis of rotation;
    a third support structure on which said second support structure is movably mounted, said third support structure including a vertically extending main mounting plate on which said second support structure is vertically movable;
    a second drive motor mounted on said first support structure and operatively connected to said lever member in order to pivot said lever member about said pivot axis;
    a drive motor system mounted on one of said first and second support structures and operatively connected to rotate said first support structure about said axis of rotation in a desired manner; and
    a further drive motor system for moving said second support structure vertically on said main mounting plate, said further drive motor system including a further drive motor mounted on said second support structure,
    wherein the operating orientation of said tool device can be turned about said two axes during use of said apparatus.

16. An apparatus according to claim 15 wherein said first support structure is a hollow, elongate post, said lever member is pivotably mounted at a top end of said post, said second drive motor is mounted within an upper section of said post, and said drive motor system includes a servomotor mounted within a lower section of said post.

17. An apparatus according to claim 16 wherein said second support structure comprises a box-like housing having a vertical supporting plate at one end, said post extends upwardly from an opposite end section of the housing, and a bottom end section of said post is rotatably mounted in said housing.

18. An apparatus according to claim 17 wherein said main mounting plate has vertical rails mounted thereon, ball slides are mounted on said supporting plate for sliding movement on said rails, and said further drive motor is operatively connected to a rack and pinion drive system in order to move said box-like housing and said post selectively upwardly or downwardly relative to said main mounting plate.

19. An apparatus according to claim 15 including a support beam adapted to extend horizontally during use of said apparatus, wherein said third support structure is slidably mounted on said support beam for movement along said beam in the lengthwise direction of the beam.

20. An apparatus according to claim 19 including a servomotor drive system for controllably moving said third support structure along said beam, said servomotor drive system including a servomotor mounted on said third support structure and a gear rotatable by said servomotor and engaging a rack mounted on said beam.

21. An apparatus for carrying out machining operations on plastic frameworks, said apparatus comprising:
    a power tool for carrying out machining operations on one of said plastic frameworks, said power tool including a first drive motor and a tool device operatively connected to and adapted to be driven by said first drive motor, said tool device including a rotatable drill bit holder and a drill bit mountable in said drill bit holder;
    a lever member pivotable about a first horizontal pivot axis and supporting said power tool at a location spaced away from said pivot axis;
    a vertically extending, first support structure on which said lever member is mounted for pivotable movement about said horizontal pivot axis, said first support structure being a hollow, elongate post, said lever member being a lever arm pivotally mounted at a top end of said post, said horizontal pivot axis being located at one end of said lever arm;
    a horizontally extending, second sup port structure on which said elongate post is mounted for rotation about a substantially vertical axis of rotation;
    a third support structure on which said second support structure is movably mounted;
    a second drive motor mounted on said first support structure and operatively connected to said lever member in order to pivot said lever member about said pivot axis, said second drive member being mounted within said post and having an output shaft connected to a bevel pinion rotatable about a vertical axis, said bevel pinion engaging a bevel gear mounted on a shaft for rotation about said pivot axis, said one end of the lever arm being attached to said shaft; and
    a drive motor system mounted on one of said first and second support structures and operatively connected to rotate said first support structure about said axis of rotation in a desired manner;
    wherein the operating orientation of said tool device can be turned about said two axes during use of said apparatus.

* * * * *